3,076,806
QUATERNARY AMMONIUM SALTS OF 1-CARBO-LOWER - ALKOXY - 4- [(10 - PHENOTHIAZINYL)-LOWER-ALKYL]PIPERAZINES AND PREPARATION THEREOF
Bernard L. Zenitz, Loudonville, and Lewis P. Albro, Rensselaer, N.Y., assignors to Sterling Drug Inc., New York, N.Y., a corporation of Delaware
No Drawing. Filed Nov. 19, 1956, Ser. No. 622,780
6 Claims. (Cl. 260—243)

This invention relates to new phenothiazinylalkylamine derivatives. In particular, the invention concernes mono-quaternary ammonium salts of 1-carbo-lower-alkoxy-4-[(10-phenothiazinyl) - lower-alkyl]piperazines, and their preparation.

Phenothiazines substituted on the nitrogen atom by a dialkylamino-lower-alkyl group are known. According to the present invention, new and useful compounds are obtained when the phenothiazine nucleus is attached through its nitrogen atom by an alkylene bridge to the nitrogen atom of a piperazine radical bearing on its other nitrogen a carbo-lower-alkoxy group, and the resulting tertiary base then converted to a quaternary ammonium salt. The phenothiazine nucleus can be unsubstituted or substituted by one or more substituents inert to the conditions under which the compounds are prepared. Such inert substituents include lower-alkyl and halogen radicals and these may be present in one or both aromatic rings.

A preferred aspect of the invention relates to quaternary ammonium salts of compounds having the formula

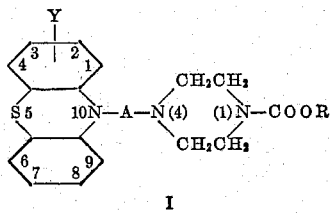

I wherein R is a lower-alkyl group, A is a lower-alkylene group, the free valences of which are on different carbon atoms, and Y is hydrogen or halogen.

In the above general Formula I, the numbering system used for the phenothiazine nucleus is in accordance with the standard nomenclature used in the Ring Index and in Chemical Abstracts.

In the above general Formula I, Y represents a halogen atom which can be in any of the four available positions in the benzene ring. Y can be any of the four halogens, fluorine, chlorine, bromine or iodine, although chlorine or bromine are preferred.

In the above general Formula I, A is an alkylene bridge which has from two to about five carbon atoms, and it may be straight or branched, the free valences being on different carbon atoms; in other words, the phenothiazine and piperazine moieties are separated by at least two carbon atoms. Thus, A includes such groups as ethylene, CH$_2$CH$_2$; propylene, CH$_2$CH$_2$CH$_2$; 1-methylethylene, CH(CH$_3$)CH$_2$; 2-methylethylene, CH$_2$CH(CH$_3$); butylene, CH$_2$CH$_2$CH$_2$CH$_2$; 1-methylpropylene,

CH(CH$_3$)CH$_2$CH$_2$ pentylene, CH$_2$CH$_2$CH$_2$CH$_2$CH$_2$; and the like.

In the above general Formula I, R represents a lower-alkyl group, preferably having from one to about six carbon atoms. R thus includes such groups as methyl, ethyl, propyl, isopropyl, butyl, isobutyl, tertiary-butyl, pentyl, hexyl, and the like.

The quaternary ammonium salts of the invention are those having anions which are therapeutically acceptable, e.g., the anions are innocuous to the host organism in therapeutic doses of the salts, so that the beneficial physiological properties inherent in the cations are not vitiated by side-effects ascribable to the anions. Acceptable anions include, inter alia, chloride, bromide, iodide, nitrate, sulfate, phosphate, acetate, quinate, loctate, tartrate, sulfonate, benzoate, and the like.

The compounds of the invention are obtained by reacting a tertiary base of Formula I with at least one molar equivalent of an ester of a strong acid. The reaction takes place by simple admixture of the tertiary-amine and the ester of a strong acid, preferably in an organic solvent inert under the conditions of the reaction. Exemplary of such inert solvents are the lower-alkanols, lower-aliphatic ethers, lower-aliphatic ketones, acetonitrile, dimethylformamide, and hydrocarbon solvents such as petroleum ether, benzene, toluene, and the like. Heating can be used to facilitate the reaction, although salt formation usually takes place readily at room temperature. The quaternary ammonium salt separates directly or can be obtained by concentration of the solution.

Preferred types of quaternary ammonium salts are obtained by the addition of alkyl, alkenyl or aralkyl esters of inorganic acids or organic sulfonic acids to the tertiary bases of Formula I. The alkyl, alkenyl or aralkyl esters so used include such compounds as methyl chloride, methyl bromide, methyl iodide, ethyl bromide, propyl bromide, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like.

Only monoquaternary ammonium salts are formed, involving the nitrogen atom in the 4-position of the piperazine ring. The nitrogen atom of the phenothiazine ring and the nitrogen atom of the piperazine ring to which the carbo-lower-alkoxy group is attached are not sufficiently basic to form quaternary ammonium salts.

It is possible to convert one quaternary ammonium salt into another in which the anion is different. If the anion of the quaternary ammonium salt forms a water-insoluble silver salt, which is true in the large majority of cases, the quaternary ammonium salt will react with silver oxide in aqueous medium to form the corresponding quaternary ammonium hydroxide in solution. The silver salt of the original anion separates as a precipitate and can be removed by filtration. The solution of the quaternary ammonium hydroxide can then be neutralized with any desired acid, weak or strong, to produce a new quaternary ammonium salt in which the anion is different from that of the original quaternary salt.

It is also possible to convert a quaternary ammonium salt of a compound of Formula I with anion, X, into a compound where the anion, X', is different by contacting an aqueous solution of the former with a quaternary ammonium strong base anion exchange resin saturated with the anion, X'. This method is particularly useful for converting the iodide into the bromide or chloride, which avoids the use of the excessively volatile methyl bromide or methyl chloride which are necessary in the direct quaternization procedure.

Still another method for converting the compound where the anion is iodide to the compound where the anion is chloride or bromide comprises contacting the iodide with an aqueous suspension of silver chloride or silver bromide. Since silver iodide is more insoluble than silver chloride or silver bromide, double decomposition will take place and the ions in solution will be exchanged. Similarly, the compound where the anion is bromide can be converted to the compound where the anion is chloride.

The intermediate tertiary-amines of Formula I are prepared by reacting in the presence of an acid acceptor phenothiazine or a halophenothiazine with an N-carbalkoxypiperazine, in which either the phenothiazine or the N-carbalkoxypiperazine bears attached to nitrogen a halo-lower-alkyl group.

The reaction of a 10-phenothiazinyl-lower-alkyl halide with an N-carbalkoxypiperazine takes place under relatively mild conditions, at a temperature between about 50° C. and 150° C. in the presence of an acid acceptor. The reaction is preferably carried out in an organic solvent, inert under the conditions of the reaction, such as anhydrous ethanol, propanol, butanol, benzene, xylene, and the like. The purpose of the acid acceptor is to take up the hydrogen halide which is split out during the course of the reaction. The acid acceptor is a basic substance which preferably forms water-soluble by-products easily separable from the main product of the reaction, including such substances as alkali metal salts of weak acids, e.g., sodium carbonate, potassium carbonate, sodium acetate, sodium alkoxides, sodium amide, and the like.

The tertiary-amines of Formula I can also be prepared by reacting phenothiazine or a halophenothiazine with an N-carbalkoxy-N'-(halo-lower-alkyl)piperazine, although the reaction requires somewhat more vigorous conditions than the reaction between the 10-phenothiazinyl-lower-alkyl halide and the N-carbalkoxypiperazine. A preferred method comprises heating the phenothiazine and N-carbalkoxy-N'-(halo-lower-alkyl)piperazine in boiling xylene in the presence of sodium amide.

The prerequisite intermediate 10-phenothiazinyl-lower-alkyl halides are a known class of compounds. They can be prepared by reacting the 10-lithio derivative of phenothiazine or of a halophenothiazine with the appropriate halo-lower-alkyl p-toluenesulfonate.

The structures of the compounds of the invention are established by chemical analysis and by the preparative methods used in their synthesis.

The following examples will further illustrate the invention, without the latter being limited thereto.

Example 1

(a) *1-carbethoxy-4-[2-(10-phenothiazinyl)ethyl]piperazine.*—A mixture of 19.5 g. (0.10 mole) of N-carbethoxypiperazine hydrochloride and 13.1 g. (0.05 mole) of 10-(2-chloroethyl)phenothiazine and 150 ml. of dry butyl alcohol was refluxed with 10.6 g. of sodium carbonate for six hours. Additional sodium carbonate (5.3 g.) was then added, and the mixture was refluxed for eighteen hours longer. The inorganic solids were removed by filtration and the filtrate concentrated in vacuo. The residue was dissolved in benzene, the benzene solution washed with water, dried over anhydrous calcium sulfate and concentrated, giving 8.9 g. of 1-carbethoxy-4[-2(10-phenothiazinyl)ethyl]piperazine, M.P. 94–96° C. A sample when recrystallized from hexane had the M.P. 101.5–102.5° C. (corr.).

*Analysis.*—Calcd. for $C_{21}H_{25}N_3O_2S$: N, 10.96; S, 8.36. Found: N, 10.80; S, 7.95.

By replacement of the N-carbethoxypiperazine hydrochloride in the preceding preparation by a molar equivalent amount of N-carbomethoxypiperazine hydrochloride, N-carboisopropoxypiperazine hydrochloride, or N-carbohexoxypiperazine hydrochloride, there can be obtained, respectively, 1-carbomethoxy-4-[2-(10-phenothiazinyl)ethyl]piperazine, 1-carboisopropoxy-4-[2-10-phenothiazinyl)ethyl]piperazine, or 1-carbohexoxy-4-[2-(10-phenothiazinyl)ethyl]piperazine.

By replacement of the 10-(2-chloroethyl)phenothiazine in the preceding preparation by a molar equivalent amount of 2-fluoro-10-(2-chloroethyl)phenothiazine,
3-bromo-10-(2-chloroethyl)phenothiazine,
4-iodo-10-(2-chloroethyl)phenothiazine,
2-methyl-10-(2-chloroethyl)phenothiazine,
2-methoxy-10-(2-chloroethyl)phenothiazine, or
2,8-dichloro-10-(2-chloroethyl)phenothiazine, there can be obtained, respectively, 1-carbethoxy-4-[2-(2-fluoro-10-phenothiazinyl)ethyl]-piperazine,
1-carboethoxy-4-[2-(3-bromo-10-phenothiazinyl)ethyl]-piperazine,
1-carbethoxy-4-[2-(4-iodo-10-phenothiazinyl)ethyl]-piperazine,
1-carbethoxy-4-[2-(2-methyl-10-phenothiazinyl)ethyl]-piperazine,
1-carbethoxy-4[2-(2-methoxy-10-phenothiazinyl)ethyl]-piperazine, or
1-carbethoxy-4-[2-(2,8-dichloro-10-phenothiazinyl)-ethyl]piperazine.

(b) *1-carbethoxy-4-[2-(10-phenothiazinyl)ethyl]piperazine methiodide.*—A solution of 15.3 g. (0.040 mole) of 1-carbethoxy-4-[2-(10-phenothiazinyl)ethyl]piperazine and 6.3 g. (0.044 mole) of methyl iodide in 100 ml. of ethyl methyl ketone was refluxed for two hours. The reaction mixture was cooled in an ice bath, and the solid product which separated was collected by filtration and washed with ethyl methyl ketone, giving 15.7 g. of 1-carbethoxy-4-[2-(10-phenothiazinyl)ethyl]piperazine methiodide, M.P. 186.5–188° C. (corr.) (dec.) when recrystallized from ethyl methyl ketone.

*Analysis.*—Calcd. for $C_{22}H_{28}IN_3O_2S$: I, 24.15; N, 8.00. Found: I, 23.65; N, 7.80.

By replacement of the methyl iodide in the preceding preparation by a molar equivalent amount of ethyl iodide, propyl bromide, allyl bromide, benzyl chloride, o-chlorobenzyl chloride, methyl sulfate, or methyl p-toluenesulfonate, there can be obtained, respectively, the ethiodide, propobromide, allobromide, benzochloride, o-chlorobenzochloride, methosulfate, or metho-p-toluenesulfonate salts of 1-carbethoxy-4-[2-(10-phenothiazinyl)ethyl]piperazine.

By replacement of the 1-carbethoxy-4-[2-(10-phenothiazinyl)ethyl]piperazine in the preceding preparation by a molar equivalent amount of 1-carbomethoxy-4-[2-(10-phenothiazinyl)ethyl]piperazine,
1-carboisopropoxy-4-[2-(10-phenothiazinyl)ethyl]piperazine,
1-carbohexoxy-4-[2-(10-phenothiazinyl)ethyl]piperazine,
1-carbethoxy-4-[2-(2-fluoro-10-phenothiazinyl)ethyl]-piperazine,
1-carbethoxy-4-[2-(3-bromo-10-phenothiazinyl)ethyl]-piperazine,
1-carbethoxy-4-[2-(4-iodo-10-phenothiazinyl)ethyl]-piperazine,
1-carbethoxy-4-[2-(2-methyl-10-phenothiazinyl)ethyl]-piperazine,
1-carbethoxy-4-[2-(2-methoxy-10-phenothiazinyl)ethyl]-piperazine, or
1-carbethoxy-4-[2-(2,8-dichloro-10-phenothiazinyl)-ethyl]piperazine, there can be obtained, respectively, 1-carbomethoxy-4-[2-(10-phenothiazinyl)ethyl]piperazine methiodide, 1-carboisopropoxy-4-[2-(10-phenothiazinyl)ethyl]-piperazine methiodide, 1-carbohexoxy-4-[2-(10-phenothiazinyl)ethyl]piperazine methiodide, 1-carbethoxy-4-[2-(2-fluoro-10-phenothiazinyl)ethyl]-piperazine methiodide, 1-carbethoxy-4-[2-(3-bromo-10-phenothiazinyl)ethyl]-piperazine methiodide, 1-carbethoxy-4-[2-(4-iodo-10-phenothiazinyl)ethyl]-piperazine methiodide, 1-carbethoxy-4-[2-(2-methyl-10-phenothiazinyl)ethyl]-piperazine methiodide, 1-carbethoxy-4-[2-(2-methoxy-10-phenothiazinyl)ethyl]-piperazine methiodide, or 1-carbethoxy-4-[2-(2,8-dichloro-10-phenothiazinyl)-ethyl]piperazine methiodide.

(c) 1 - carbethoxy - 4 - [2 - (10 - phenothiazinyl)-ethyl]piperazine methochloride.—Silver nitrate (20.4 g., 0.120 mole) was dissolved in deionized water containing a small excess of 2 N hydrochloric acid. The precipitate of silver chloride thus produced was washed by decantation with deionized water until the washings were neutral. A solution of 12.9 g. (0.0243 mole) of 1-carbethoxy-4-[2-(10-phenothiazinyl)ethyl]piperazine methiodide in 150 ml. of hot ethanol was diluted with 250 ml. of water, the silver chloride was added to the solution, and the mixture was stirred for forty-eight hours while covered with a cloth to exclude light. After that time the silver salts were removed by filtration and the filtrate concentrated in vacuo. The residue was dissolved in 100 ml. of methyl ethyl ketone and again concentrated in vacuo to remove traces of water. The latter residue was dissolved in 75 ml. of methyl ethyl ketone, the solution cooled and diluted with water which caused a gum to separate. The supernatant solution was decanted from the gum, and the gum was rubbed with a little acetone to induce crystallization. The crystalline product was dissolved in 10 ml. of absolute methanol, the solution diluted with 250 ml. of boiling methyl ethyl ketone, and the resulting solution filtered and concentrated until crystallization began, giving 6.4 g. of 1-carbethoxy-4-[2-(10-phenothiazinyl)ethyl]piperazine methochloride. Further recrystallization from a methanol-methyl ethyl ketone mixture gave a sample with the M.P. 208–209.5° C. (corr.).

Analysis.—Calcd. for $C_{22}H_{28}ClN_3O_2S$: N, 9.68; Cl, 8.17. Found: N, 9.65; Cl, 8.02.

By stirring an aqueous solution of 1-carbethoxy-4-[2-(10-phenothiazinyl)ethyl]piperazine methiodide with an excess of silver oxide, and removing the resulting precipitate of a mixture of silver iodide and silver oxide, there can be obtained a solution of the corresponding quaternary ammonium hydroxide. By neutralization of the latter with nitric acid, nitrous acid, acetic acid, phosphoric acid, sulfuric acid, citric acid, tartaric acid, benzoic acid, or quinic acid, there can be obtained the methyl quaternary salt of 1-carbethoxy-4-[2-(10-phenothiazinyl)ethyl]-piperazine wherein the anion is nitrate, nitrite, acetate, phosphate (or acid phosphate), sulfate (or bisulfate), citrate (or acid citrate), tartrate (or bitartrate), benzoate, or quinate, respectively.

*Example 2*

(a) 1 - carbethoxy - 4 - [3 - (10 - phenothiazinyl)-propyl]piperazine.—A mixture of 44.1 g. (0.16 mole) of 10-(3-chlorobutyl)phenothiazine, 46.7 g. (0.24 mole) of N-carbethoxypiperazine hydrochloride and 42.4 g. (0.40 mole) of sodium carbonate in 400 ml. of absolute ethanol was refluxed for three hours with stirring. An additional 8.5 g. of sodium carbonate was added and the mixture refluxed for eighteen hours longer. Another 8.5 g. of sodium carbonate was added and the mixture refluxed for eleven hours longer. The inorganic solids were removed by filtration, the solid material washed with ethanol, and the combined filtrates and washings were concentrated to dryness on a steam bath in vacuo. The residue was dissolved in 300 ml. of benzene, and the benzene solution was washed with water until neutral. The benzene solution was extracted three times with 250 ml. of water containing 5 ml. of concentrated hydrochloric acid. The aqueous acid extracts were made basic with sodium hydroxide and extracted with benzene. The benzene extracts were washed with water, dried over anhydrous calcium sulfate and concentrated. The residue was recrystallized from 250 ml. of hexane, giving 41.3 g. of 1-carbethoxy - 4 - [3 - (10-phenothiazinyl)propyl]piperazine, M.P. 93.5–95° C. (corr.).

Analysis.—Calcd. for $C_{22}H_{27}N_3O_2S$: N, 10.57; S, 8.07. Found: N, 10.45; S, 7.79.

(b) 1 - carbethoxy - 4 - [3 - (10 - phenothiazinyl)-propyl]piperazine methiodide.—A solution of 30.0 g. (0.076 mole) of 1-carbethoxy-4-[3-(10-phenothiazinyl)-propyl]piperazine and 11.8 g. (0.083 mole) of methyl iodide in 150 ml. of methyl ethyl ketone was refluxed for four hours. The product obtained by concentration of this solution was recrystallized from ethanol, giving 37.6 g. of 1-carbethoxy-4-[3-(10-phenothiazinyl)propyl]piperazine methiodide, M.P. 167–169° C. (corr.).

Analysis.—Calcd. for $C_{23}H_{30}IN_3O_2S$: N, 7.79; S, 5.94. Found: N, 7.59; S, 5.98.

*Example 3*

(a) 1 - carbethoxy - 4 - [4 - (10 - phenothiazinyl)-butyl]piperazine was prepared from 39.0 g. (0.20 mole) of N-carbethoxypiperazine hydrochloride and 29.0 g. (0.1 mole) of 10-(4-chlorobutyl)phenothiazine according to the manipulative procedure described above in Example 2, part (a). There was thus obtained 21.4 g. of 1-carbethoxy-4-[4-(10-phenothiazinyl)butyl]piperazine, M.P. 78.5-80.5° C. (corr.).

Analysis.—Calcd. for $C_{23}H_{29}N_3O_2S$: N, 10.21; S, 7.79. Found: N, 10.16; S, 7.68.

(b) 1 - carbethoxy - 4 - [4 - (10 - phenothiazinyl)-butyl]piperazine methiodide.—A solution of 30.3 g. (0.073 mole) of 1-carbethoxy-4-[4-(10-phenothiazinyl)-butyl]piperazine and 11.4 g. (0.080 mole) of methyl iodide in 150 ml. of methyl ethyl ketone was refluxed for four hours. The product was recrystallized from ethanol giving 37.6 g. of 1-carbethoxy-4-[4-(10-phenothiazinyl)butyl]piperazine methiodide, M.P. 174–177° C. (corr.).

Analysis.—Calcd. for $C_{24}H_{32}IN_3O_2S$: N, 7.79; S, 5.79. Found: N, 7.46; S, 5.62.

(c) 1 - carbethoxy - 4 - [4 - (10 - phenothiazinyl)-butyl]piperazine methochloride was prepared from 13.8 g. (0.025 mole) of 1-carbethoxy-4-[4-(10-phenothiazinyl)-butyl]piperazine methiodide and silver chloride [prepared from 21.3 g. (0.125 mole) of silver nitrate and 70 ml. (0.13 mole) of 1.865 N hydrochloric acid] according to the manipulative procedure described above in Example 1, part (c). There was thus obtained 9.0 g. of 1-carbethoxy-4-[4-(10-phenothiazinyl)butyl]piperazine methochloride, M.P. 198.5–199° C. (corr.) (dec.) when recrystallized from an ethanol-ether mixture.

Analysis.—Calcd. for $C_{24}H_{32}ClN_3O_2S$: N, 9.09; S, 6.94. Found: N, 8.86; S, 7.13.

*Example 4*

(a) 5-chloropentyl p-toluenesulfonate.—A mixture of 190.6 g. (1.0 mole) of p-toluenesulfonyl chloride, 111.8 g. (1.3 moles) of tetrahydropyran and 12.4 g. (0.09 mole) of freshly fused zinc chloride was gradually heated, and a vigorous reaction began at about 90° C., whereupon the reaction temperature rose to 156° C. without the aid of external heating. When the reaction had slackened, the mixture was heated on a steam bath for twenty-four hours with stirring. The reaction mixture was then added to cracked ice, extracted with ether, and the ether extracts were washed successively with water, sodium carbonate solution, and again with water, and dried over anhydrous potassium carbonate and anhydrous calcium sulfate. The ether solution was concentrated, and the residue distilled after adding 10 g. of pulverized sodium hydroxide. The fraction boiling at 155–166° C. (0.25–0.32 mm.) was collected; 149.6 g., $n_D^{25}$=1.5157. This material was redistilled, giving 122.9 g. of 5-chloropentyl p-toluenesulfonate, B.P. 148–153° C. (0.14–0.23 mm.), $n_D^{25}$=1.5157.

*Analysis.*—Calcd. for $C_{12}H_{17}ClO_3S$: C, 52.07; H, 6.19; S, 11.58. Found: C, 52.13; H, 6.72; S, 11.38.

(b) *10-(5-chloropentyl)phenothiazine.*—Lithium wire (7.64 g., 1.10 moles) was cut into small pieces and added to 300 ml. of anhydrous ether in a nitrogen atmosphere. The mixture was cooled to 0° C. and a few ml. of n-butyl bromide in 70 ml. of ether was added. The mixture was further cooled to −10° C., and sufficient n-butyl bromide to bring the total to 75.5 g. (0.55 mole) was added during one hour. The mixture was stirred for one hour at 0° C., then cooled to −10° C., and 99.5 g. (0.50 mole) of phenothiazine was added during ten minutes. The reaction mixture was stirred for one hour, cooled to −15° C., and 138.2 g. of 5-chloropentyl p-toluenesulfonate in 125 ml. of ether was added during one hour. The reaction mixture was stirred at −10° C. for one-half hour, at 0° C. for one-half hour and at room temperature for one hour. The ether solution was extracted with water, dried over anhydrous calcium sulfate and concentrated. The residue (150 g.) was dissolved in 1 liter of hexane and chromatographed on a 4.5 x 70 cm. aluminum oxide column. The column was eluated with 10 liters of hexane and the resulting 120 g. of product was rechromatographed on a 3.5 x 60 cm. aluminum oxide column. The product thus obtained was distilled, collecting the fraction boiling at 157.5–160° C. (0.090 mm.), giving 86.0 g. of 10 - (5 -chloropentyl)phenothiazine $n_D^{25}$=1.6391.

*Analysis.*—Calcd. for $C_{17}H_{18}ClNS$: Cl, 11.67; S, 10.55. Found: Cl, 11.54; S, 10.28.

(c) *1 - carbethoxy - 4 - [5 - (10 - phenothiazinyl) pentyl]piperazine* was prepared from 30.4 g. (0.10 mole) of 10-(5-chloropentyl)phenothiazine and 23.7 g. (0.15 mole) of N-carbethoxypiperazine hydrochloride according to the manipulative procedure described above in Example 1, part (a). The free base product did not crystallize, so the hydrochloride salt was prepared by treating the free base with an excess of ethereal hydrogen chloride solution. There was thus obtained 21.6 g. of 1-carbethoxy - 4 - [5 - (10 -phenothiazinyl) - pentyl]piperazine hydrochloride, M.P. 174.5–177° C. (corr.).

*Analysis.*—Calcd. for $C_{24}H_{31}N_3O_2S.HCl$: N, 9.10; Cl, 7.67. Found: N, 8.98; Cl, 7.53.

(d) *1 - carbethoxy - 4 - [5 - (10 - phenothiazinyl) pentyl]piperazine methiodide* can be prepared by reacting 1 - carbethoxy - 4 - [5 - (10 - phenothiazinyl)pentyl]piperazine with methyl iodide according to the manipulative procedure described above in Example 1, part (b).

*Example 5*

(a) *1 - carbethoxy - 4 - {3 - [10 - (2 - chlorophenothiazinyl)]propyl}-piperazine* was prepared from 15.5 g. (0.05 mole) of 10-(3-chloropropyl)-2-chlorophenothiazine and 15.8 g. (0.10 mole) of N-carbethoxypiperazine according to the manipulative procedure described above in Example 1, part (a). The product was recrystallized from hexane and from acetone, giving 12.7 g. of 1-carbethoxy - 4 - {3 - [10 - (2 - chlorophenothiazinyl)]propyl} piperazine, M.P. 95–96° C. (corr.).

*Analysis.*—Calcd. for $C_{22}H_{26}ClN_3O_2S$: N, 9.73; Cl, 8.21. Found: N, 9.57; Cl, 8.14.

(b) *1 - carbethoxy - 4 - {3 - [10 - (2 - chlorophenothiazinyl)]propyl}piperazine methiodide* can be prepared by reacting 1-carbethoxy-4-{3-[10-(2-chlorophenothiazinyl)]propyl}piperazine with methyl iodide according to the manipulative procedure described above in Example 1, part (b).

*Example 6*

(a) *3 - chloro - 10 - (3 - chloropropyl)phenothiazine* was prepared from 5.3 g. (0.76 mole) of lithium wire, 52.0 g. (0.38 mole) of n-butyl bromide, 81.8 g. (0.35 mole) of 3-chlorophenothiazine, and 87 g. (0.35 mole) of 3-chloropropyl p-toluenesulfonate, according to the manipulative procedure described above in Example 4, part (b). The product was distilled, and the fraction boiling at 141–147° C. (0.04 mm.), 65.5 g., $n_D^{25}$=1.6660, was crystallized from hexane, giving 55 g. of 3-chloro-10-(3-chloropropyl)phenothiazine, M.P. 45–47° C. The analytic sample was dried over phosphorous pentoxide and had the M.P. 45-47.5° C. (corr.).

*Analysis.*—Calcd. for $C_{15}H_{13}Cl_2NS$: Cl, 22.86; S, 10.33. Found: Cl, 22.62; S, 10.25.

(b) *1 - carbethoxy - 4 - {3 - [10 - (3 - chlorophenothiazinyl)]propyl}piperazine* was prepared from 15.5 g. (0.05 mole) of 10-(3-chloropropyl)-3-chlorophenothiazine and 15.8 g. (0.10 mole) of N-carbethoxypiperazine according to the manipulative procedure described above in Example 1, part (a). The free base product was converted to its hydrochloride salt by treatment with ethereal hydrogen chloride, and the salt recrystallized from an ethanol-ether mixture. There was thus obtained 1-carbethoxy - 4 - {3 - [10 - (3 - chlorophenothiazinyl)]propyl} piperazine hydrochloride, M.P. 181–183° C. (corr.).

*Analysis.*—Calcd. for $C_{22}H_{26}ClN_3O_2S.HCl$: N, 8,97; Cl (ionic), 7.57. Found: N, 8.84; Cl (ionic), 7.44.

(c) *1 - carbethoxy - 4 - {3 - [10 - (3 - chlorophenothiazinyl)]propyl}piperazine methiodide* can be prepared by reacting 1-carbethoxy-4-{3-[10-(3-chlorophenothiazinyl)]propyl}piperazine with methyl iodide according to the manipulative procedure described above in Example 1, part (b).

Chemotherapeutic evaluation of the compounds of the invention has demonstrated that the compounds are useful as anthelmintic agents. When administered orally to mice infected with oxyurid worms, e.g., *Syphacea obvelata* or *Aspicularis tetraptera*, the compounds completely cleared the animals of the infection at dose levels of 200–400 mg. per kg. per day. At these dose levels there were no manifestations of toxic effects in the host animals.

The compounds of the invention can be prepared for use by incorporating them in syrup, tablet or capsule form for oral administration. They are formulated in the same manner as known compounds having similar anthelmintic properties, such as piperazine citrate and gentian violet.

We claim:

1. A member of the group consisting of the pharmacologically acceptable lower alkyl, lower-alkenyl and monocarbocyclic aryl-lower-alkyl quaternary ammonium salts of 1 - carbo-lower-alkoxy-4-[(10-phenothiazinyl)-lower-alkyl]piperazine in which the phenothiazine and piperazine moieties are separated by at least two carbon atoms.

2. The pharmacologically acceptable lower-alkohalide ammonium salts of compounds having the formula

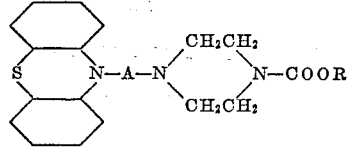

wherein R is a lower-alkyl group, and A is a lower-alkylene group, the free valences of which are on different carbon atoms.

3. The pharmacologically acceptable lower-alkohalide ammonium salts of compounds having the formula

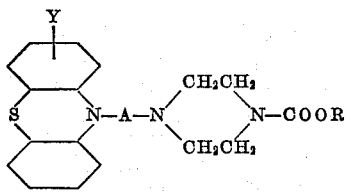

wherein R is a lower-alkyl group, A is a lower-alkylene group, the free valences of which are on different carbon atoms, and Y is halogen.

4. 1 - carbethoxy-4-[2-(10-phenothiazinyl)ethyl]piperazine methohalide.

5. 1 - carbethoxy-4-[3-(10-phenothiazinyl)propyl]-piperazine methohalide.

6. 1 - carbethoxy-4-[4-(10-phenothiazinyl)butyl]-piperazine methohalide.

References Cited in the file of this patent

UNITED STATES PATENTS

| | | |
|---|---|---|
| 2,590,125 | Robinson et al. | Mar. 25, 1952 |
| 2,827,459 | Horclois | Mar. 18, 1958 |

FOREIGN PATENTS

| | | |
|---|---|---|
| 203,708 | Australia | Oct. 20, 1955 |
| 293/55 | South Africa | Aug. 22, 1955 |